US008077961B2

(12) United States Patent
Schmalz et al.

(10) Patent No.: US 8,077,961 B2

(45) Date of Patent: Dec. 13, 2011

(54) BANK NOTE PROCESSING MACHINE AND METHOD FOR IDENTIFYING FORGED BANK NOTES

(75) Inventors: Steffen Schmalz, München (DE); Norbert Holl, Germering (DE)

(73) Assignee: Giesecke & Devrient GmbH, Munich (DE)

( * ) Notice: Subject to any disclaimer, the term of this patent is extended or adjusted under 35 U.S.C. 154(b) by 430 days.

(21) Appl. No.: 10/583,721

(22) PCT Filed: Dec. 20, 2004

(86) PCT No.: PCT/EP2004/014507

§ 371 (c)(1), (2), (4) Date: Oct. 1, 2007

(87) PCT Pub. No.: WO2005/064549

PCT Pub. Date: Jul. 14, 2005

(65) Prior Publication Data

US 2008/0107325 A1 May 8, 2008

(30) Foreign Application Priority Data

Dec. 23, 2003 (DE) .................................. 103 60 859

(51) Int. Cl.
*G06K 9/00* (2006.01)
*G06K 9/46* (2006.01)

(52) U.S. Cl. ......................... 382/135; 382/137; 382/191

(58) Field of Classification Search .................. 382/100, 382/135–140; 235/379, 491, 487, 383; 283/72; 209/534

See application file for complete search history.

(56) References Cited

U.S. PATENT DOCUMENTS

| | | | | |
|---|---|---|---|---|
| 4,200,255 | A * | 4/1980 | Schmidt et al. | 248/291.1 |
| 4,349,111 | A * | 9/1982 | Shah et al. | 209/534 |
| 5,619,620 | A | 4/1997 | Eccles | |
| 5,799,102 | A * | 8/1998 | Leong | 382/135 |
| 6,254,002 | B1 * | 7/2001 | Litman | 235/450 |
| 6,550,671 | B1 * | 4/2003 | Brown et al. | 235/379 |
| 6,560,355 | B2 * | 5/2003 | Graves et al. | 382/135 |
| 7,014,105 | B2 * | 3/2006 | Fujioka | 235/379 |
| 7,487,919 | B2 * | 2/2009 | Giering et al. | 235/491 |

(Continued)

FOREIGN PATENT DOCUMENTS

DE 694 17 378 T2 9/1999

(Continued)

OTHER PUBLICATIONS

Signature verification, increasing performance by a multi stage system, Feb. 2000.*

(Continued)

*Primary Examiner* — Vikkram Bali
*Assistant Examiner* — Nancy Bitar
(74) *Attorney, Agent, or Firm* — Bacon & Thomas, PLLC

(57) ABSTRACT

The invention relates to a bank note processing machine and a method for recognizing forged bank notes.

With the bank note processing machine according to the invention and the method for recognizing forged bank notes according to the invention the starting point is that the bank notes to be checked are compared with comparative data that are derived from authentic bank notes and known forgeries, additional comparative data of new types of forgeries being used and the bank notes to be checked being compared with both the comparative data and the additional comparative data for new types of forgeries, so as to determine whether a forged bank note is present.

8 Claims, 1 Drawing Sheet

U.S. PATENT DOCUMENTS

| | | | | |
|---|---|---|---|---|
| 7,552,864 | B2 | 6/2009 | Weilacher et al. | |
| 7,812,935 | B2 * | 10/2010 | Cowburn et al. | 356/71 |
| 7,853,792 | B2 * | 12/2010 | Cowburn | 713/176 |
| 7,866,545 | B2 * | 1/2011 | Rapf et al. | 235/379 |
| 2003/0059098 | A1 * | 3/2003 | Jones et al. | 382/135 |
| 2003/0132281 | A1 * | 7/2003 | Jones et al. | 235/379 |
| 2003/0168849 | A1 * | 9/2003 | Reinisch | 283/72 |
| 2004/0028266 | A1 | 2/2004 | Jones et al. | |
| 2007/0095891 | A1 * | 5/2007 | Giering et al. | 235/379 |
| 2008/0236990 | A1 * | 10/2008 | Ehrich et al. | 194/207 |
| 2008/0283451 | A1 * | 11/2008 | Holl et al. | 209/534 |
| 2009/0242627 | A1 | 10/2009 | Reinisch et al. | |

FOREIGN PATENT DOCUMENTS

| | | | |
|---|---|---|---|
| DE | 100 29 051 | A1 | 12/2001 |
| EP | 0 660 276 | B1 | 3/1999 |
| EP | 1 160 737 | A1 | 12/2001 |
| EP | 1 255 232 | A1 | 11/2002 |
| EP | 1255232 | * | 11/2008 |
| JP | 2001-157044 | * | 6/2001 |
| RU | 2 158 443 | C1 | 4/1999 |
| WO | WO 80/01963 | | 9/1980 |

OTHER PUBLICATIONS

Search Report of German Patent Office dated Nov. 17, 2004 relating to DE 103 60 859.1 (2 pgs.).

C. Sansone and M. Vento: "Signature Verification: Increasing Performance by a Multi-Stage System", *Pattern Analysis and Applications*, vol. 3, 2000, pp. 169-181, XP002322573, London.

* cited by examiner

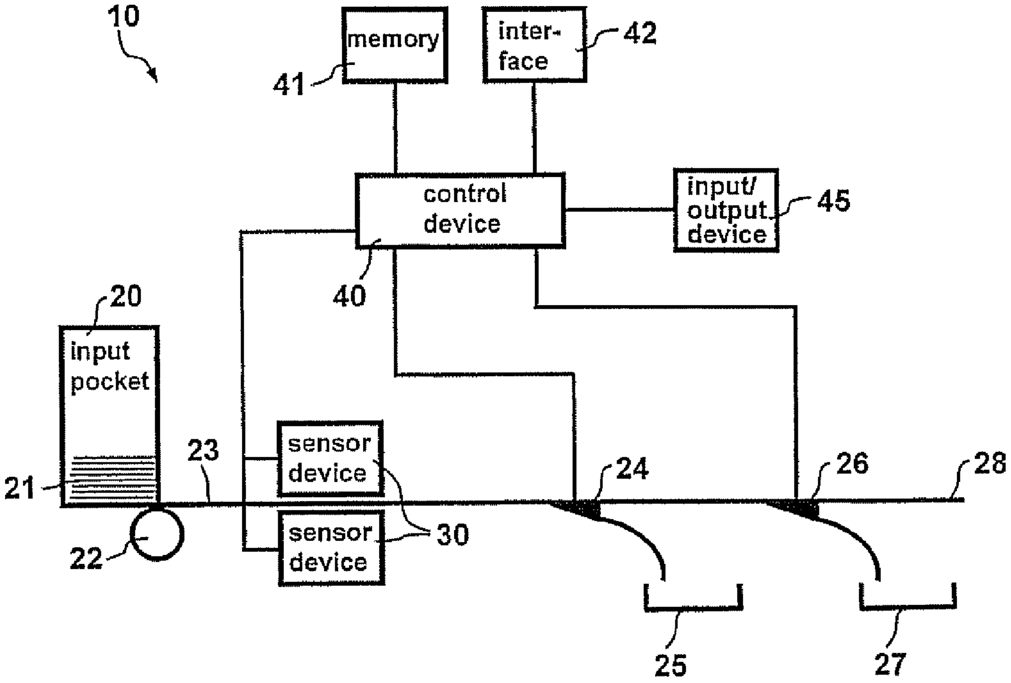
Fig.

BANK NOTE PROCESSING MACHINE AND METHOD FOR IDENTIFYING FORGED BANK NOTES

FIELD OF THE INVENTION

The invention relates to a bank note processing machine and a method for recognizing forged bank notes.

BACKGROUND

Bank note processing machines are used for checking bank notes as to their properties, such as authenticity, state, kind of bank note etc. Dependent on the result of the check, the bank notes can be, for example, accepted, sorted, stored, destroyed etc. Here the recognition of forged bank notes is of particular importance. For recognizing bank notes and for differentiating authentic bank notes from forgeries, usually from authentic bank notes criteria or comparative data are derived that permit a recognition of the individual bank note as to currency and denomination and its authenticity. If for specific bank notes, i. e. for a specific denomination of a specific currency, forgeries have become known, these forgeries too are used for deriving comparative data. For this purpose authentic bank notes and forgeries are processed with a bank note processing machine, in order to produce data of the sensors of the bank note processing machine for authentic bank notes and forgeries. Then from the data of the sensors, in sometimes very elaborate processing steps, comparative data for recognizing the bank notes and checking their authenticity are derived.

But it has turned out that in particular with the assessment of the authenticity of bank notes there can arise special problems, if in addition to the forgeries taken into account when producing the comparative data, new types of forgeries emerge. In these cases it can occur, that these new types of forgeries are not recognized and thus are judged as authentic bank notes.

It is obvious that in the described cases it is possible to derive comparative data once more, taking into account also the new types of forgeries beside the authentic bank notes and hitherto known forgeries. Such a procedure, however, has the disadvantage that the entire comparative data have to be derived at least for the kind of bank notes concerned, i. e. the denomination of a specific currency concerned. Moreover, at least the comparative data for the specific kind of bank notes have to be replaced in the bank note processing machines. Here incompatibility problems with the comparative data of the other kinds of bank notes may arise. In order to reliably avoid these problems, usually the entire comparative data are freshly produced, in order to replace the comparative data hitherto used in the bank note processing machines. This, however, requires a considerable effort, since great data volumes have to be mastered. Due to the described considerable effort with the known proceeding the further problem arises that new types of forgeries cannot be taken into account as soon as shortly after their occurrence, since deriving and producing the comparative data already demands a considerable time.

SUMMARY

It is the problem of the present invention to provide a bank note processing machine and a method for recognizing forged bank notes, wherein new types of forgeries can be reliably recognized with low effort and already a short time after the occurrence of these new types of forgeries.

With the bank note processing machine according to the invention and the method for recognizing forged bank notes according to the invention the starting point is that the bank notes to be checked are compared with comparative data that are derived from authentic bank notes and known forgeries, additional comparative data of new types of forgeries being used and the bank notes to be checked being compared with both the comparative data and the additional comparative data for new types of forgeries, so as to determine whether a forged bank note is present.

By using additional comparative data for new types of forgeries there can be achieved that forgeries can even be reliably recognized when these could not have been taken into account in the original production of the comparative data used, since the features, with which the new type of forgeries can be recognized, are contained in the additional comparative data. By separating the comparative data and the additional comparative data it is also possible to react immediately and to instantly provide additional comparative data for each new type of forgery, so that one can immediately react to new types of forgeries.

BRIEF DESCRIPTION OF THE DRAWING

The FIGURE shows a schematic representation of a basic structure of a bank note processing machine for recognizing forged bank notes.

DETAILED DESCRIPTION OF VARIOUS EMBODIMENTS

The bank note processing machine 10 has an input pocket 20 for feeding bank notes 21 to be processed, into which a singler 22 engages. The singler 22 seizes one of the bank notes 21 to be processed at a time and transfers the individual bank note to a transport system 23, which transports the individual bank note through a sensor device 30. In the sensor device 30 features of each individual bank note are captured, which are relevant, for example, for assessing the authenticity, kind (currency, denomination), state etc of the bank note. Such features can be captured, for example, mechanically, acoustically, optically, electrically and/or magnetically. Known authenticity features are, for example, printing inks with special optical and/or magnetic properties, metallic or magnetic security threads, the use of bank note paper free of brighteners, information contained in an electrical circuit etc. The kind of bank note is determined e.g. by its size, printing pattern, colors etc, whereas the state of the bank note can be derived, for example, from the optical appearance (soiling). The features are captured by the sensor device 30, and respective data of the sensor device 30 are transferred to a control device 40.

The control device 40 compares the data of the captured features with comparative data, which permit the recognition of authentic or forged bank notes and/or bank notes suspected of being forged, the kind of bank notes, the state of the bank notes etc. The comparative data and programs required for operating the bank note processing machine 10 are provided in the form of a software and are stored in the control device 40 or in a non-volatile memory 41 associated to the control device 40. The non-volatile memory 41 can be formed e.g. by an EEPROM or a flash memory. Furthermore, a not shown working memory can be connected with the control device 40, which the control device 40 uses for running the software.

The comparative data stored in the non-volatile memory 41 are produced for each kind of bank note, i.e. in particular for each denomination of the currencies that are to be processed with the bank note processing machine 10. The comparative data are produced by scanning a number of authentic bank notes of each denomination and currency by the sensor device 30 or a similarly structured different sensor device and thereby capturing the above-described features and producing respective data. Additionally, forgeries of the respective denomination and currency—if known—are processed in the same way and thereby especially marked as forgeries. From the data of the authentic bank notes and the forgeries comparative data for each denomination of each currency are produced, which are suitable for recognizing the respective denomination and currency and for checking their authenticity. It is also possible to produce separate comparative data for recognizing, i. e. for determining denomination and currency and for checking the authenticity, so that separate comparative data for recognizing and for checking the authenticity are provided. In order to be independent of the respective position of each bank note during the later processing of bank notes, the comparative data usually are produced for all four possible positions of the bank notes. The respective comparative data are produced in the same way for all denominations of all currencies that are to be checked.

On the basis of monitoring or checking the respective bank note performed by the control device 40, switches 24, 26 disposed in the transport system 23 are actuated in order to store, for example, forged bank notes and/or bank notes suspected of being forged in an output pocket 25, whereas bank notes assessed to be authentic can be stored in a different output pocket 27. Furthermore, the transport system 23 can be carried on, so that the bank notes can be further processed 28, e.g. fed to further output pockets, a safe or a cassette, a shredder etc.

As to control the bank note processing machine 10 by an operator an input/output device 45 is connected with the control device 40, so that, for example, specific processing modi can be selected or the operator can be informed about the processing of the bank notes 21.

The bank note processing machine 10 described by way of example can be used for counting, checking, sorting etc. the bank notes. Likewise, it is thinkable that the bank note processing machine 10 forms an automatic counter, which can be used, for example, for depositing bank notes. But the bank note processing machine 10 can also be component of a vending machine.

When manufacturing or configuring the bank note processing machine 10 it can be provided, that the required software, in particular the comparative data, is stored in the non-volatile memory 41 already beforehand. In addition, an interface 42 is provided, which permits that the stored software or the comparative data provided in the non-volatile memory 41 are exchanged entirely or partly and/or are complemented by additional components. For this purpose the interface 42 can be designed e.g. as a modem, network interface, connection to the Internet, parallel, serial, or USB interface, or as a reading device for an optical or magnetic memory etc.

If new types of forgeries are discovered, these new types of forgeries are processed in the above-described fashion by the bank note processing machine 10 or a sensor device corresponding to the sensor device 30, and the data of the features of the new type of forgery are produced. From these data additional comparative data for the new type of forgery are derived. For this the deviations shown by the new type of forgery in comparison to authentic bank notes are especially suitable. The deviations can be recognized and selected by an operator, for example because the deviations of the new type of forgery are visible. But it is also possible, that the above-described data or comparative data of the authentic bank notes are used. In this case the data of the new type of forgery delivered by the sensor device 30 are compared with the data or comparative data of the authentic bank notes, it being possible that the comparison is performed by the operator or in an automatic fashion, e.g. by the control device 40. From the deviations gained in such a way comparative data for the new type of forgery are derived and produced. As described above, it can be provided, that comparative data for each of the four possible positions of the bank note, i. e. new type of forgery, are derived and produced, so that later the recognition of the new type of forgery can be effected independently of the respective position.

Then the comparative data of the new types of forgeries can be distributed to any desired number of bank note processing machines 10, can be loaded via the interface 42 and stored in the non-volatile memory 41.

When processing bank notes 21 with the bank note processing machine 10 then the bank notes 21 to be processed are compared with both the comparative data already present in the non-volatile memory 41 and the additional comparative data of the new types of forgeries supplementarily loaded via the interface 42. If on the basis of the comparative data for the new type of forgeries bank notes are recognized as forgeries, these, according to the usual procedure, are marked as forgeries and treated accordingly, e.g. are stored in the output pocket 25.

From the above description it becomes obvious, that for each new type of forgery comparative data about the respective new type of forgery have to be derived, produced and provided to the bank note processing machines. But it is also possible that a plurality of new types of forgeries are taken into account at the same time and for these common additional comparative data are produced. It is especially advantageous to collect new types of forgeries as to produce common additional comparative data that relate to bank notes of a specific kind, i. e. new types of forgeries of bank notes of a specific currency and denomination, e.g. 50 € bank notes.

Checking the bank notes can be carried out more effective, when at first the control device 40 in the bank note processing machine 10 determines, which kind of bank note it is, i. e. which currency and which denomination the bank note has. If the authenticity check of the bank note with the help of the comparative data originally provided in the non-volatile memory 41 has already revealed that it is a forgery, a further check can be cancelled. Otherwise it is selectively checked, whether for the determined kind of bank note (currency, denomination) additional comparative data for new types of forgeries are available. If comparative data do not exist, the check can be terminated. If comparative data for one or a plurality of new types of forgeries are available, the respective comparative data can be compared with the data of the sensor device 30 for the respective bank note, in order to determine whether the respective bank note is forged.

But it is also possible, that at first a check of the data of the sensor device 30 of the respective bank note with the additional comparative data for new types of forgeries is effected, and afterwards the check with the help of the originally provided comparative data.

Beside the described embodiment a plurality of modifications are possible.

For example, during the processing in the bank note processing machine 10 the bank notes can be transported along their long or short edge by the transport system 23. It is obvious, that the comparative data have to be provided in dependence on the design of the transport system 23, since the comparative data depend on the transport direction of the bank notes.

In a different modification of the described embodiment it can be provided, that the control device 40, the non-volatile memory 41, the sensor device 30 etc are not directly connected to each other as shown, but via one or a plurality of data busses.

A further modification can be, that for the sensor device 30 a separate control device and/or a separate non-volatile memory is provided, which performs the check of the bank notes and passes on the result of the bank note check to the control device 40, so that the control device can perform the controlling of the bank note processing machine 10 in the above-described fashion. In this case it can be provided, that software for the control device 40 and the separate control device is provided and loaded separately. Likewise, the software for the two control devices can be commonly provided and loaded.

The invention claimed is:

1. A method for recognizing forged bank notes with a bank note processing machine, the method comprising the steps of:

processing the bank notes with the bank note processing machine;

checking the bank notes with comparative data stored by the bank note processing machine and derived from authentic bank notes and known forgeries, wherein the comparative data is produced by capturing features selected from the group consisting of printing inks with special optical and/or magnetic properties, metallic or magnetic security threads, paper used for the bank notes being free of brighteners, information contained in an electrical circuit, bank note size, printing pattern, colors, optical appearance, and combinations thereof; and using additional comparative data for new types of forgeries, which are not recognized based on the comparative data derived from authentic bank notes and known forgeries;

wherein the bank notes to be checked are compared with both the comparative data and the additional comparative data for new types of forgeries so as to determine whether a forged bank note is present.

2. The method according to claim 1, wherein bank notes to be checked are compared with the comparative data, and wherein only a comparison with the additional comparative data for new types of forgeries is effected, if with the check with the help of the comparative data the authenticity of the bank notes to be checked has been determined.

3. The method according to claim 1, wherein bank notes to be checked are compared with the comparative data, so as to determine their kind, and only a comparison with the additional comparative data for new types of forgeries is effected, if for the determined kind of bank notes comparative data for new types of forgeries are available.

4. The method according to claim 1, wherein comparative data and additional comparative data for new types of forgeries are available for each possible position of the bank notes.

5. The method according to claim 1, wherein the additional comparative data for new types of forgeries are derived and produced from the new type of forgery after the first occurrence of the new type of forgery.

6. A bank note processing machine comprising a control device, a non-volatile memory and a sensor device, for recognizing forged bank notes, wherein the bank notes to be checked are captured by the sensor device and data are derived, which are compared with comparative data stored in the non-volatile memory, which are derived from authentic bank notes and known forgeries, wherein the comparative data is produced by capturing features selected from the group consisting of printing inks with special optical and/or magnetic properties, metallic or magnetic security threads, paper used for the bank notes being free of brighteners, information contained in an electrical circuit, bank note size, printing pattern, colors, optical appearance, and combinations thereof, and further wherein in the non-volatile memory additional comparative data for new types of forgeries, which are not recognized based on the comparative data derived from authentic bank notes and known forgeries, are stored, the data of the sensor device for the bank notes to be checked being compared by the control device with both the comparative data and the additional comparative data for new types of forgeries, so as to determine whether a forged bank note is present.

7. The bank note processing machine according to claim 6, wherein an interface is provided, via which additional comparative data for new types of forgeries are loaded and stored in the non-volatile memory.

8. A method for recognizing forged bank notes with a bank note processing machine, the method comprising the steps of:

processing the bank notes with the bank note processing machine;

checking the bank notes with comparative data stored by the bank note processing machine and derived from authentic bank notes and known forgeries, wherein the comparative data is produced by capturing features related to physical properties of bank notes; and using additional comparative data for new types of forgeries, which are not recognized based on the comparative data derived from authentic bank notes and known forgeries;

wherein the bank notes to be checked are compared with both the comparative data and the additional comparative data for new types of forgeries so as to determine whether a forged bank note is present.

* * * * *